US006443624B1

(12) United States Patent
Knepper et al.

(10) Patent No.: US 6,443,624 B1
(45) Date of Patent: Sep. 3, 2002

(54) HIGH SPEED ANGULAR CONTACT BALL BEARING

(75) Inventors: Richard A. Knepper, Keene, NH (US); Tadao Tsuneyoshi, North Canton, OH (US); William E. Harbottle, Fort Lauderdale, FL (US); Neal C. McBain, Lebanon, NH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 09/629,511

(22) Filed: Aug. 1, 2000

(51) Int. Cl.$^7$ ............................................. F16C 19/08
(52) U.S. Cl. ...................... 384/492; 384/465
(58) Field of Search ................... 384/492, 625, 384/537, 450, 513, 516, 565, 569

(56) References Cited

U.S. PATENT DOCUMENTS

| 3,161,448 A | 12/1964 | Moran |
| 4,400,042 A | 8/1983 | Fritz |
| 4,565,457 A | 1/1986 | Flander |
| 4,635,330 A | 1/1987 | Fritz |
| 4,659,241 A | 4/1987 | Bamberger et al. |
| 4,978,235 A | 12/1990 | Jacob |
| 5,000,054 A | 3/1991 | Morishita et al. |
| 5,002,729 A | 3/1991 | Wert et al. |
| 5,338,377 A | 8/1994 | Mitamura et al. |
| 5,424,028 A | 6/1995 | Maloney et al. |
| 5,843,369 A | 12/1998 | Obara et al. |
| 5,851,313 A | 12/1998 | Milam |
| 5,873,956 A | 2/1999 | Tanaka et al. |

FOREIGN PATENT DOCUMENTS

| DE | 19629398 | 7/1996 |
| EP | A10711929 | 5/1996 |
| GB | A2330628 | 4/1999 |

OTHER PUBLICATIONS

The Timken Company, Bearing Selection Handbook Revised—1986, pp. 16 and 17.
Latrobe Steel Company, Preliminary DataSheet, CSS–42L VIM–VAR, Jun. 1997.

*Primary Examiner*—Lenard A. Footland
(74) *Attorney, Agent, or Firm*—Polster, Lieder, Woodruff & Lucchesi, L.C.

(57) ABSTRACT

An angular contact ball bearing has races formed from a case-carburized or carbonitrided steel, preferably a stainless steel, that withstands high forces and high temperatures. The bearing has relatively low osculation ratios to reduce the generation of heat, yet can withstand applied radial loads and the centrifugal forces generated in high speed operation.

21 Claims, 2 Drawing Sheets

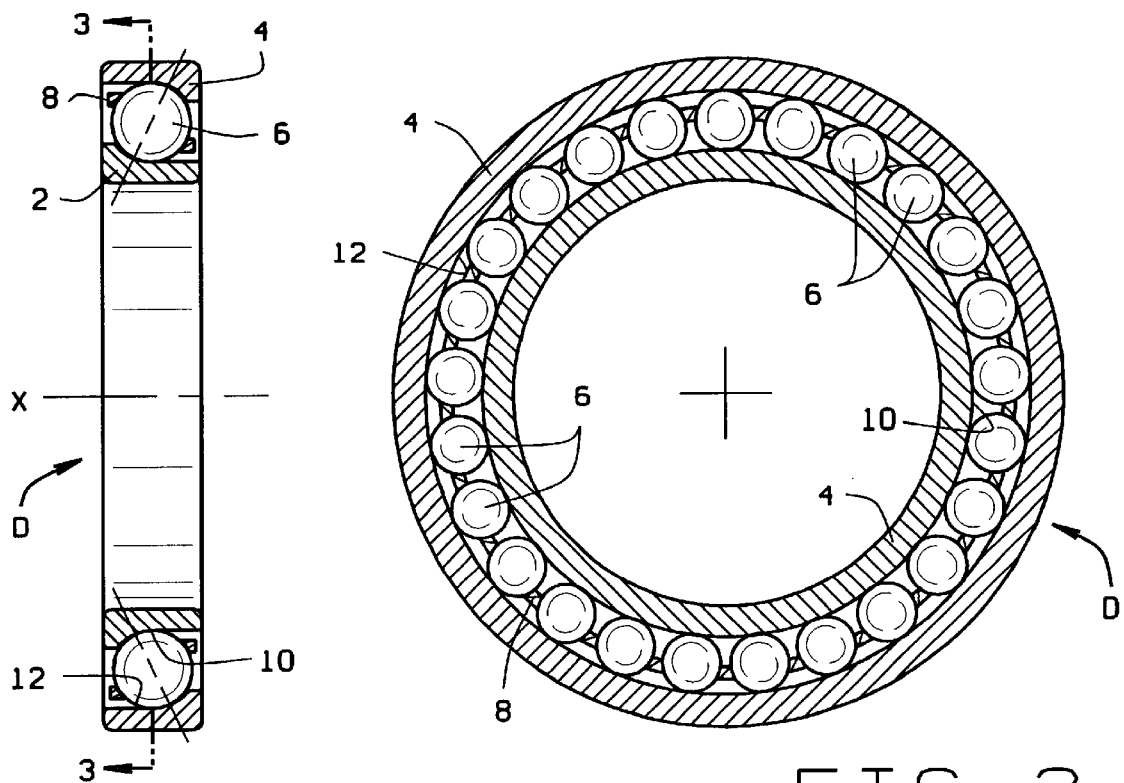
FIG. 2
FIG. 3
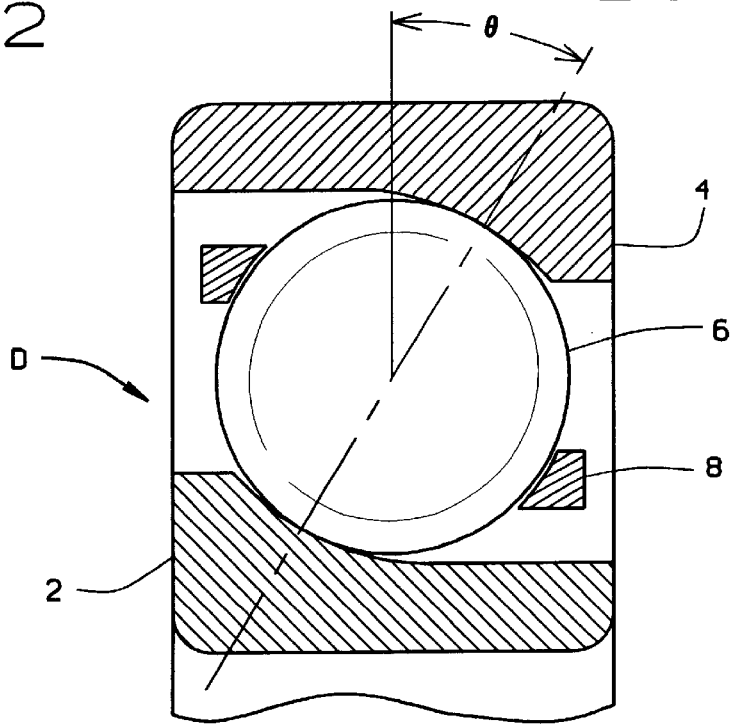
FIG. 4

HIGH SPEED ANGULAR CONTACT BALL BEARING

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates in general to antifriction bearings and more particularly to a high speed angular contact ball bearing.

Cutting tool technology has improved over the years and with it the capacity to remove metal at ever-increasing speeds. Thus, machine tools have been called upon to operate at higher velocities to take advantage of the improvements in cutting tool technology, but to a large measure have failed in this regard. Not only must the next generation of machine tool spindles revolve at higher velocities, but they must also possess rigidity or stiffness in the sense that the axes about which they revolve remain fixed. In other words, the bearings for a spindle, while allowing the spindle to rotate, must not possess any radial or axial free motion. Multiple angular contact ball bearings, with some mounted in opposition to others, seem to serve these needs best, but this type of bearing arrangement still fails to accommodate the speeds at which modern cutting tools have the capacity to operate.

The typical angular contact ball bearing has inner and outer races with opposed raceways, and a row of balls located between the races where they roll along the raceways when the bearing is set in operation. In cross section, the raceways are arcuate, but the region of contact along the one raceway is offset axially from the region of contact along the other raceway, so that a line drawn through the regions of contact lies oblique to the axis of the bearing. This angular contact enables the bearing to take axial loads as well as radial loads. When two or more of these bearings are mounted in opposition, as with machine tool spindles, the multiple bearings will accommodate thrust loads in both axial directions. In order to enhance rigidity, the opposed bearings normally have a built-in axial load normally referred to as a preload.

In a sense, the typical angular contact ball bearing used to support a high speed machine tool spindle represents several compromises. Perhaps, the most significant is in the osculation ratio, that is the ratio of the radius of the ball to the radius of curvature for the raceway taken transversely to the path of the balls. When the ratio is high (the raceway more closely conforms to the ball), the bearing can take higher loads, than when the ratio is low, but the bearing generates more heat with a higher osculation ratio, and this is particularly troublesome at high speeds.

Typically, the angular contact ball bearings that support a high speed spindle are contained within a housing where they occupy a nose position and a tail position. The housing usually has spiral coolant grooves through which a coolant circulates for dissipating the heat generated by the bearings. While good heat transfer is available at the housing, this does not hold true with regard to the spindle supported on the bearings. It tends to operate at higher temperatures than the housing and as a consequence undergoes greater axial and radial expansion than the housing. The radial expansion may increase he preload in the bearings. The axial expansion may disrupt preload even more and to accommodate it some mountings allow the bearings in the tail position to float. This requires a loose fit between the housing and the outer races of the bearings in the tail position, and the loose fit over time leads to fretting corrosion. The fretting corrosion may cause the floating outer race to eventually seize in the housing which in turn subjects the bearings to the dangers of excessive preloads. After all, the races for the typical bearing used to support a spindle are formed from bearing steel that is not stainless. This steel resists corrosion no better than ordinary steel, and is thus subject to fretting corrosion. Also, high vibrational forces can result caused by an unbalanced condition due to the high speed of the spindle.

Fretting is not the only source of corrosion. The seals, which protect the bearings, must rely on labyrinths to exclude contaminants to which the spindle is subjected in order to avoid generating heat themselves. They are thus less effective than seals that actually contact wear surfaces. Contaminants, such as cutting fluids, stand a greater chance of entering the bearings and producing corrosion.

Finally, high speed operation produces tremendous centrifugal forces in the bearings, and those forces that result from the balls are resisted primarily by the outer race. Reducing the size of the steel balls and thus their mass lessens the centrifugal force, but it also reduces load-carrying capacity of a bearing. A compromise is required to obtain the optimum ball size.

While the centrifugal forces developed during high speed operation impose heavy cyclic loads on the outer races of the bearing, they also expand the inner races. Thus, the inner race of each bearing must be installed over the spindle with an interference fit that remains notwithstanding the expansion, because a loose fit will not only disrupt the rigidity of the axis, but will also produce fretting corrosion between the inner race of the bearing and the spindle. For example, if the diameter of the bore for the inner race expands 0.0014 in. more than the spindle by the time the spindle reaches its operating speed, the inner race must be installed with an interference fit of at least 0.0014 in. and preferably more. This does not account for tolerances, so as a practical matter the interference fit should be somewhat greater. Indeed, when one factors in tolerances, the stresses developed in the inner race by reason of the interference fit and the centrifugal forces can exceed the capacity of conventional 52100 steel to withstand those stresses. That steel, when used for the race of a spindle bearing, exists in a through-hardened state. But through-hardened races, being brittle, fracture under lesser stress than more ductile low carbon steels. The logical alternatives are to clamp the inner races very tightly in place or produce the spindles and bearings in matched sets with closer tolerances, but these alternatives increase the cost of the spindle and bearing.

There is therefore a need for an improved, low heat-generating, durable ball bearing assembly that is capable of withstanding relatively high speeds with a reduced oscillation ratio.

BRIEF SUMMARY OF THE INVENTION

The present invention resides in a high speed angular contact ball bearing that is formed from a case-hardened steel and has low osculation ratios between its balls and the raceways along which they roll, and that steel is preferably a stainless steel. The invention also resides in a mounting that includes a high speed spindle supported in a housing on such bearings mounted in opposition.

BRIEF DESCRIPTION OF THE SEVERAL VIEWS OF THE DRAWINGS

FIG. 2 is a traverse sectional view of one of the bearings;

FIG. 3 is a sectional view of the bearing taken along line 3—3 of FIG. 2; and

FIG. 4 is an enlarged fragmentary sectional view of the bearing.

Corresponding reference numerals will be used throughout the several figures of the drawings.

DETAILED DESCRIPTION OF THE INVENTION

Figure 1:
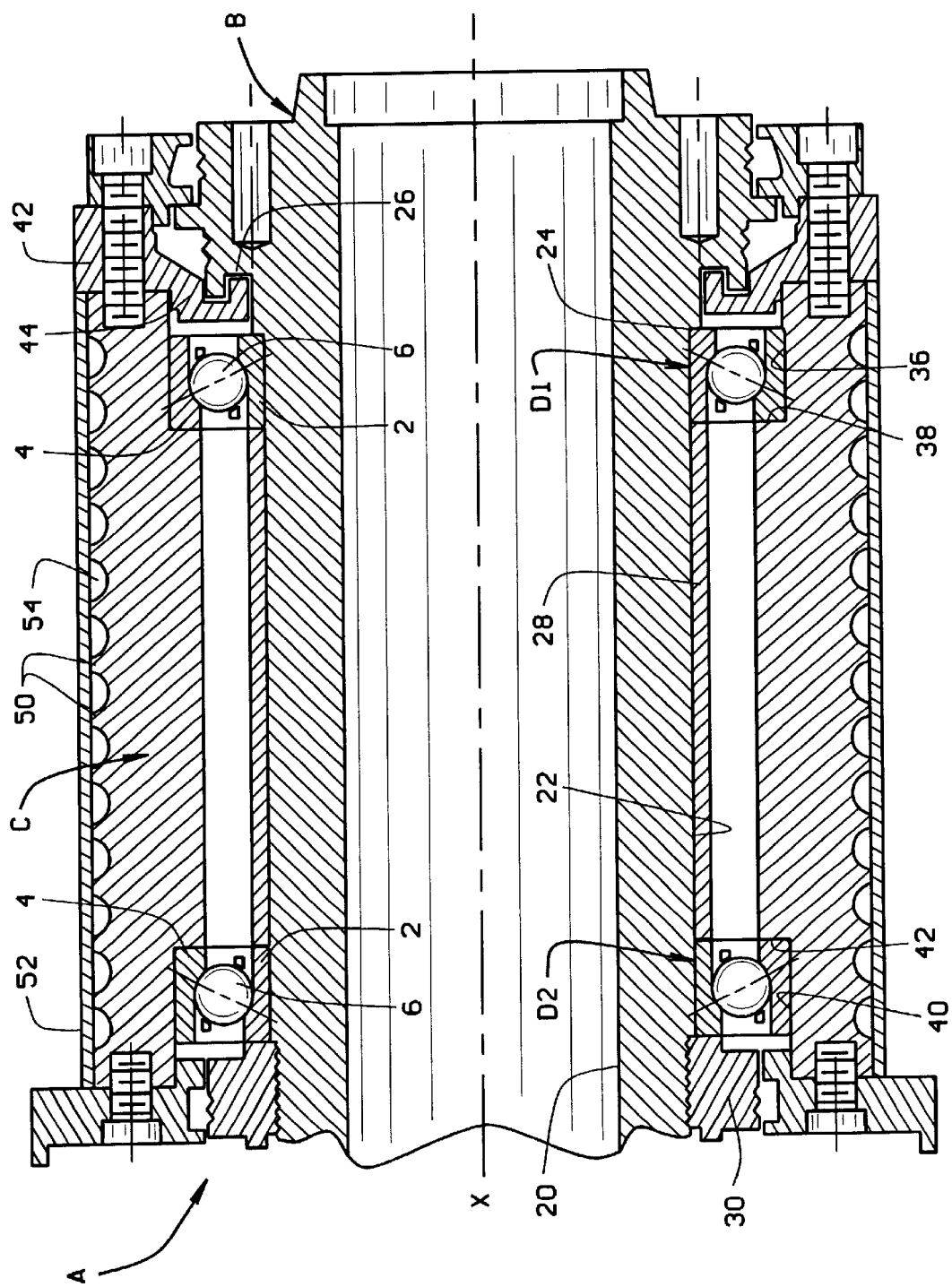
FIG. 1 is a sectional view of a housing in which a spindle rotates on two angular contact ball bearings constructed in accordance with and embodying the present invention.

The following detailed description illustrates the invention by way of example and not by way of limitation. This description will clearly enable one skilled in the art to make and use the invention, and describes several embodiments, adaptations, variations, alternatives and uses of the invention, including the best mode of carrying out the invention.

Referring now to the drawings, a mounting in the form of a head stock A (FIG. 1) for a machine tool includes a spindle B and a housing C in which the spindle B rotates about an axis X. The spindle B is supported on two single row angular contact ball bearings D, which also form part of the head stock A, with the one bearing D1 being in the nose position and the other bearing D2 being in the tail position. Both of the bearings D share the same axis X. The spindle B extends beyond the bearing D1 at the nose position where it supports a cutting tool or workpiece. It also extends beyond the bearing D2 at the tail position where it is coupled to a drive for rotating the spindle B at high velocities. Indeed, the bearings D enable the spindle B to rotate at velocities of at least one million DN (where D=diameter of the inner bearing race in mm and N=velocity in rev/min) and even at velocities of two million DN or more.

Each bearing D includes (FIGS. 2–4) an inner race 2, an outer race 4 located around the inner race 2, and rolling elements in the form of balls 6 located between the races 2 and 4. Each also includes a cage or retainer 8 which is likewise located between the races 2 and 4 to maintain generally uniform spacing between the balls 6. Actually, the balls 6 contact the races 2 and 4 along raceways 10 and 12, respectively, which are arcuate and concave in cross section, that is to say, in the direction transverse to the circular paths formed by the raceways 10 and 14. When the bearing D is set in operation, the balls 6 roll along the raceways 10 and 12 and reduce friction between the spindle B and housing C to a bare minimum. In a sense the raceways 10 and 12 are slightly offset axially in that the regions of contact between balls 6 and the raceway 10 are displaced axially from the regions of contact between the balls 6 and the raceway 12. Thus, a line extended through the center of each region will intersect the axis X at an oblique angle and will likewise lie at an oblique angle $\theta$ to a plane that is perpendicular to the axis X (FIG. 4). The angle $\theta$ is referred to as the contact angle. As a consequence of the oblique orientation of the raceways 10 and 12, the bearing D takes not only radial loads, but also thrust or axial loads in the direction which causes the balls 6 to seat more firmly against the raceways 10 and 12—a characteristic of an angular contact ball bearing.

The spindle B contains (FIG. 1) a bore 20 which receives a chuck that holds the cutting tool or workpiece. It also has a cylindrical surface 22 that leads up to a shoulder 4, beyond which the spindle B is provided with a labyrinth 26. The inner race 2 of the bearing D1, which is in the nose position, is installed over the cylindrical surface 22 with an interference fit, this being achieved by pressing the race 2 over the surface 22 or expanding it with heat and then advancing it over the surface 22. In any event, the inner race 2 of the bearing D1 bears against the shoulder 24 at the end of the cylindrical surface 22. The inner race 2 of the remaining bearing D2 also fits around the cylindrical surface 22 with an interference fit and, being in the tail position, is spaced from the race 2 of the bearing D1 that is in the nose position. The inner races 2 of the bearings D1 and D2 are separated by a sleeve-like spacer 28 which also fits around the cylindrical surface 22 of the spindle B. The inner race 2 of the bearing D1 is captured between the shoulder 24 and the sleeve 28, whereas the inner race 2 of the bearing D2 is captured between the spacer 28 and a nut 30 that threads over the end of the spindle B.

The interference fits between the inner races 2 and the cylindrical surface of the spindle B keep the races 2 fitted tightly to the spindle B notwithstanding the centrifugal forces developed during high speed operation. For example, where the cylindrical surface 22 has a diameter of 2.75 in. (70 mm), each inner race 2 will expand about 0.0016 in. at 30000 rev/min (2.2 DN). The spindle B, on the other hand, will expand 0.0002 in., assuming that it is solid. Therefore, each inner race 2 should have a minimum tight fit of at least 0.0014 in. to insure that the race 2 does not become loose at these angular velocities due to the centrifugal force that is generated within it. While the inner races 2 can withstand interference fits of 0.0014 in. and beyond, more conventional races formed from through-hardened steel can accept an interference fit of only about 0.0010 in. Beyond that, a conventional race will fracture. Thus, the inner races 2 withstand tight interference fits and remain tight at extremely high angular velocities, all while accommodating standard tolerances.

The housing C has (FIG. 1) a bore 36 that extends inwardly from the nose end of the housing C and terminates at a shoulder 38. It also has another bore 40 that extends into it from its tail end and terminates at a shoulder 42. The outer race 4 of the bearing D1 fits into the bore 36 with an interference fit effected by pressing it into the bore 36. When so fitted, the outer race 4 for the bearing D1 bears against the shoulder 38. The outer race 4 of the other bearing D2 fits with an interference fit into the bore 40 that opens out of the tail end of the housing C where it bears against the shoulder 42.

The length of the sleeve 28 that separates the inner races 2 of the bearings D1 and D2 is such that it places the bearings D in a condition of preload—preload which remains during the operation of the spindle B and bearings D.

Fitted against the end of the housing C is a labyrinth 44 which mates with the labyrinth 26 on the spindle B, the two effect a fluid barrier between the spindle B and the housing C at the nose end of the head stock A. While the separation between the labyrinths 26 and 44 is ever so slight, the labyrinths 26 and 44 do not contact each other.

The housing C on its exterior surface has (FIG. 1) a spiral groove extended circumferentially around it. The groove 50 is enclosed with a cylindrical jacket 52, thus creating an annular spiral path through which a liquid coolant circulates.

In each of the bearings D, the contact angle $\theta$ between the balls 6 and the raceways 10 and 12 of the inner race 2 and outer race 4, respectively, typically ranges between 15° and 18° and varies according to the intended use of the spindle B. This enables the bearings D to carry thrust loads including the preload under which they operate. It also enables them to take heavy radial loads, including the centrifugal forces generated by the balls 6 as they orbit rapidly around the inner races 2.

The osculation ratio for the region at which any one of the balls 6 contacts one of the raceways 10 or 12 represents the radius of the balls 6 divided by the cross-sectional radius of the raceway 10 or 12, that is the radius measured transversely with respect to the direction in which the balls 6 move along the raceway 10 or 12. Typically, bearings with smaller osculation ratios produce less heat, but also have lower load-carrying capacities. The osculation ratios for conventional angular ball bearings used to support high speed spindles range between 0.943 and 0.962. The bearings D have lesser osculation ratios, without any loss in load capacity. The osculation ratio between the balls 6 and the raceway 10 of the inner race 2 for either of the bearings D should range between 0.72 and 0.89 and will vary depending upon the application. The osculation ratio between the balls 6 and the raceway 12 of the outer race 4 for any of the bearings D should range between 0.72 and 0.93, and will vary depending upon the application.

The lesser osculation ratios and other advantages as well derive from improved steels used in the races 2 and 4 and from case-carburizing and heat treatments to which those races 2 and 4 are subjected. These steels can be characterized as stainless steels having a carbon content before case-hardening of between 0.05% and 0.50% by weight and a chromium content of between 10.0% and 20.0% by weight. The steel should have the capacity to accept and accommodate a hardened case formed by carburizing or carbonitriding followed by a heat treatment. Suitable steels include those sold under the trademark CSS-42L and the trademark PYROWEAR 675 and also AISI 420. The compositional ranges of these high alloy steels appear in the following table:

| | BROAD RANGES (wt. %) | | |
|---|---|---|---|
| | CSS-42L | PYROWEAR 675 | AISI 420 |
| C | 0.10 to 0.25 | 0.05 to 0.1 | >.15 |
| Mn | 1.0 max. | 1.5 max. | 1.00 max. |
| Si | 1.0 max. | 1 max. | 1.00 max. |
| Cr | 13.0 to 19.0 | 11 to 15 | 12.00 to 14.00 |
| Mo | 3.0 to 5.0 | 1 to 3 | n.s. |
| V | 0.25 to 1.25 | 0.1 to 1 | n.s. |
| Ni | 1.75 to 5.25 | 1.5 to 3.5 | n.s. |
| Co | 5.0 to 14.0 | 3 to 8 | n.s. |
| Nb | 0.01 to 0.10 | n.s. | n.s. |
| B | 0.02 max. | n.s. | n.s. |
| N | n.s. | 0.04 max. | n.s. |
| Fe | balance | Balance | balance |

Latrobe Steel Company of Latrobe, Pa., sells CSS-42L steel, and that steel forms the subject of U.S. Pat. No. 5,424,028 granted Jun. 13, 1999. Carpenter Technology Corporation of Reading, Pa., sells PYROWEAR 675 steel, and it forms the subject of U.S. Pat. No. 5,002,729 granted Mar. 26, 1991. The two patents are incorporated herein by reference.

CSS-42L steel, which was developed for purposes quite apart from machine tool spindle bearings, is a stainless steel alloy that is capable of being case-carburized and withstanding sustained operating temperatures as high as 700° F. It has the capacity to achieve and maintain high surface hardness when case-carburized and heat treated, and it combines high fracture toughness, hot hardness, metal-to-metal wear resistance, and corrosion resistance while retaining core ductility and strength. CSS-42L alloy steel was developed particularly for use in high temperature, corrosive environments, such as the gears and shafts of helicopter transmissions. Its intended uses include other machine components such as cams, shafts, gears and bolts, which operate at high temperatures and in corrosive environments. Rolling contact fatigue testing of CSS-42L alloy steel has shown this material to exhibit test lives that far exceed those of competitive materials.

The inner race 2 and the outer race 4 are both forged or otherwise formed from a suitable high alloy steel. The shapes so produced are then machined to the configuration required for the races and are thereafter case-carburized or carbonitrided and heat treated in accordance with procedures set forth below. This leaves the races 2 and 4 with a hard exterior case and a more ductile core. Indeed, after appropriate heat treatment, the races 2 and 4 along their raceways 10 and 12, respectively, and other exterior surfaces as well, acquire a hardness on the order of 68 to 70 Rockwell C. The carburizing or carbonitriding also leaves the case in a state of compression.

Briefly, to achieve the novel case hardness, microstructure and residual stress properties of highly alloyed chromium-containing ferrous alloys, and to eliminate cracking of the case on cooling from carburizing, the stainless steel should be carburized or carbonitrided to a relatively high carbon content, namely, at levels of 1.5 by weight or more at the working surface, that is to say at the raceways 10 and 12. The carburizing or carbonitriding occurs in a furnace where the races 2 and 4 are packed in a compound that is rich in carbon or where they are subjected to gas that is rich in carbon. Carburizing may also be achieved with a plasma process such as disclosed in U.S. Pat. No. 5,851,313 granted Dec. 22, 1998.

The post-carburization hardening to produce the novel microstructure is most effectively carried out with the use of a vacuum furnace; however, conventional furnaces also provide satisfactory results. If the carburizing is done in a vacuum furnace, the temperature can be raised from the 1600°–1800° F. (870°–985° C.) carburizing temperature directly to the austenitizing temperature of 2000°–2050° F. (1090°–1120° C.), followed by oil quenching. Parts requiring a double-quench (such as when gas carburizing is used) can be hardened by preheating to 1450° F. (790° C.), then austenitizing at 2000°–2050° F. (1090°–1120° C.), followed by gas fan quenching in nitrogen to about 150° F. (66° C.) and air cooling to room temperature. U.S. patent application Ser. No. 09524,938, filed Mar. 14, 2000 for the invention of H. Burrier, D. Milam, J. Maloney and C. Tomasello entitled High Performance Carburizing Stainless Steel for High Temperature Use, describes the case-hardening procedure. That patent application is incorporated herein by reference.

The balls 6 may likewise be formed from CSS-42L steel which is case carburized or they may be formed from stainless steel that is through-hardened. On the other hand, the balls 6 may be formed from silicon nitride ($Si_3N_4$) which is a ceramic material available from Norton Advanced Ceramics, East Granby, Connecticut, under the trademark CERBEC, among other sources. Silicon nitride has excellent compressive strength and, being a ceramic, withstands extremely high temperatures without loss of strength. Few corrosive materials will harm it. It has a mass density of 42% of that of steel, and thus under high speed operating conditions it produces less inertial effects and thereby increases the life of the races 2 and 4 as well as increasing the life of the balls 6. Its coefficient of thermal expansion is about one-fourth that of steel. Finally, it is extremely hard and has a modulus of elasticity 50% greater than steel. This increases the static and dynamic stiffness of the bearing D.

In any event, the races 2 and 4 of the bearings D carry the loads imposed by and transferred through the balls 6, irrespective of whether the balls 6 are formed from steel or from silicon nitride, and this holds true even with the lesser osculation ratios. The temperature of the bearings D remains low, usually less than 130° F. (55° C.) and more likely less than 110° F. (43° C.), owing to the low osculation ratios. It certainly remains within the temperature range which CSS-42L steel can tolerate, which is up to 700° F. (370° C.). When the cutting fluid at the work piece enters into the bearings D, it will not produce corrosion because the critical components of the bearings D are formed from stainless steel. While the outer race 4 for the bearing D2 does not float, some mountings which have two bearings D mounted in opposition in the tail position (duplexed) allow the outer races 4 of those bearings to float as the spindle B expands and contracts axially with temperature changes that differ from those of the housing C. Any fretting corrosion produced by such floating will remain within acceptable levels.

Not only do the lower osculation ratios of the bearings D result in the generation of less heat, but they also enable the bearings D to have stronger retainers 8. In this regard, the retainers 8 are preferably molded from a polymer that is capable of withstanding the elevated temperatures at which the bearings D may operate. Owing to their low densities, polymers produce less inertial effects than steel. Machined fabric-reinforced phenolic resin is suitable for the retainers 8, as is PEEK (polyether-ether ketone). So is the material sold by Saint Gobain Performance Plastics (formerly Furon Company) of Wayne, N.J., under the trademark MELDIN 2001. The lower osculation ratios for each bearing D result in less variation in the contact angle as the inner race 2 rotates within the outer race 4, and this reduces the variation in the velocity of the balls 6. Since the balls 6 speed up and slow down less during each revolution and their angular position relative to each other changes less, the pockets which receive the balls 6 in the retainer 8 may be, and indeed are, made smaller than the pockets for the retainers of conventional spindle bearings. The smaller pockets increase the strength of the retainer 8. Moreover, less energy is absorbed by reducing the acceleration and deceleration impact of the balls 6 on the retainer 8, and this further reduces the generation of heat in the bearing D.

Case-carburizing imparts residual stresses, compressive in nature, to the races 2 and 4 along their raceways 10 and 12, because the case, with its greater proportion of martensite than the core, seeks to expand on the core. The inner race 2, with its ductile core and its carburized case in a high state of compression, can withstand tighter interference fits on the spindle B than traditional races formed from through-hardened steel. The inner race 2 formed from case-carburized stainless steel exhibits less tendency to crack under tight interference fits than does traditional through-hardened steel. The tighter interference fits lessen the prospect of the inner race 2 expanding under centrifugal force to the point of becoming loose. The tighter interference fits also permit the spindle B at its cylindrical surface 22 and the inner races 2 at their bores to be manufactured with wider tolerances than mountings using through-hardened races. Indeed, this holds true even for bearings D having inner races 2 formed from more conventional low carbon, steels such as SAE 8620, that cannot be classified as stainless steel.

The carburized case and tough core on the two races 2 and 4 of each bearing D allow them to accommodate small radial holes for introducing lubricants to their respective raceways 10 and 12, all without any significant danger of cracks propagating from holes in the races 2 and 4. This contrasts with through-hardened races which are subject to cracking and crack propagation at holes formed in them.

In general, the bearing D having races 2 and 4 formed from high alloy stainless steel which has been case-carburized or carbonitrided and balls 6 formed from the same steel or silicon nitride, when compared with traditional bearings having races formed from through-hardened steel, have greatly increased life and may be operated at considerably higher velocities with lower heat generation.

While the head stock A supports its spindle B on only two bearings D, other head stocks may support their spindles on multiple bearings D in both the nose and tail positions. In some arrangements of this type the bearings D in the tail position, when duplexed may float.

As various changes could be made in the above constructions without departing from the scope of the invention, it is intended that all matter contained in the above description or shown in the accompanying drawings shall be interpreted as illustrative and not in a limiting sense.

What is claimed is:

1. A high speed bearing for facilitating rotation about an axis, said bearing comprising: an inner race having a raceway that is arcuate in cross-section and presented away from the axis; an outer race surrounding the inner race and having a raceway that is arcuate in cross-section and presented toward the raceway of the inner race; and balls arranged in a row between the races and contacting the raceways of the races; the osculation ratio between the balls and the raceways of both of the races not exceeding about 0.93; the races being formed from a stainless steel containing by weight between about 0.05% and 0.50% carbon and between about 10.0% and 20.0% chromium, the races having hardened cases formed by case-carburizing or carbonitriding, the bearing when operating at one million DN attaining an operating temperature of less than 130° F.

2. A high speed bearing for facilitating rotation about an axis, said bearing comprising: an inner race having a raceway that is arcuate in cross-section and presented away from the axis; an outer race surrounding the inner race and having a raceway that is arcuate in cross-section and presented toward the raceway of the inner race; and balls arranged in a row between the races and contacting the raceways of the races; the balls contacting the raceway of the inner race in regions axially offset from the regions where the balls contact the raceway of the outer race; the osculation ratio between the balls and the raceway of at least one of the races not exceeding about 0.93; the races being formed from a stainless steel containing by weight between about 0.05% and 0.50% carbon and between about 10.0% and 20.0% chromium, the races having hardened cases formed by case-carburizing or carbonitriding.

3. A bearing according to claim 2 wherein the contact angle for the bearing is between 15° and 30°.

4. A bearing according to claim 1 wherein the balls are formed from a stainless steel comprising by weight between about 0.05% and 0.50% carbon and between about 10.0% and 20.0% chromium.

5. A high speed bearing for facilitating rotation about an axis, said bearing comprising: an inner race having a raceway that is arcuate in cross-section and presented away from the axis; an outer race surrounding the inner race and having a raceway that is arcuate in cross-section and presented toward the raceway of the inner race; and balls arranged in a row between the races and contacting the raceways of the races; the osculation ratio between the balls and the raceway of at least one of the races not exceeding about 0.93; the balls being formed from silicon nitride; the races being formed from a stainless steel containing by weight between about 0.05% and 0.50% carbon and between about 10.0% and 20.0% chromium, the races having hardened cases formed by case-carburizing or carbonitriding.

6. A high speed bearing for facilitating rotation about an axis, said bearing comprising: an inner race having a raceway that is arcuate in cross-section and presented away from the axis; an outer race surrounding the inner race and having a raceway that is arcuate in cross-section and presented toward the raceway of the inner race; and balls arranged in a row between the races and contacting the raceways of the races; the osculation ratio between the balls and the raceway of inner race not exceeding about 0.89 and the osculation ratio between the balls and the raceway of the outer race not exceeding about 0.93; the races being formed from a stainless steel containing by weight between about 0.05% and 0.50% carbon and between about 10.0% and 20.0% chromium, the races having hardened cases formed by case-carburizing or carbonitriding.

7. A high speed bearing for facilitating rotation about an axis, said bearing comprising: an inner race having a raceway that is arcuate in cross-section and presented away from the axis; an outer race surrounding the inner race and having a raceway that is arcuate in cross-section and presented toward the raceway of the inner race; and balls arranged in a row between the races and contacting the raceways of the races; the osculation ratio between the balls and the raceway of at least one of the races not exceeding about 0.93; the races being formed from a stainless steel containing by weight between about 0.05% and 0.50% carbon and between about 10.0% and 20.0% chromium with the stainless steel of at least one of the races being selected from a group consisting of CSS-42L, PYROWEAR 657 and A1S1 420 steels, the races having hardened cases formed by case-carburizing or carbonitriding.

8. In a machine tool, the combination comprising: a housing; a spindle located within the housing; and a plurality of angular contact ball bearings located between the spindle and the housing for enabling the spindle to rotate at high angular velocities within the housing about an axis of rotation, one of the bearings being oriented in opposition to the another of the bearings such that the bearings transfer radial loads and thrust loads in both axial directions between the spindle and the housing, each bearing including an inner race located around the spindle and having a raceway that is arcuate in cross section and is presented away from the axis, an outer race located in the housing and having a raceway that is arcuate in cross section and presented toward the raceway of the inner race, and balls arranged in a circular row between the inner and outer races and contacting the raceways of the races, the osculation ratio between the balls and rolling elements of at least one of the races not exceeding about 0.93, the races of the bearings being formed from a steel containing by weight between about 0.05% and 0.50% carbon and between about 10.0% and 20.0% chromium, the races having hardened cases formed by carburizing or carbonitriding.

9. The combination according to claim 8 wherein the osculation ratio between the balls and the raceways of the inner races does not exceed about 0.89 and the osculation ratio between the balls and the raceways of the outer races does not exceed about 0.93.

10. The combination according to claim 8 wherein the balls are formed from silicon nitride.

11. In a machine tool, the combination comprising: a housing; a spindle located within the housing; and a plurality of angular contact ball bearings located between the spindle and the housing for enabling the spindle to rotate at high angular velocities within the housing about an axis of rotation, one of the bearings being oriented in opposition to the another of the bearings such that the bearings transfer radial loads and thrust loads in both axial directions between the spindle and the housing, each bearing including an inner race located around the spindle and having a raceway that is arcuate in cross section and is presented away from the axis, an outer race located in the housing and having a raceway that is arcuate in cross section and presented toward the raceway of the inner race, and balls arranged in a circular row between the inner and outer races and contacting the raceways of the races, the osculation ratio between the balls and rolling elements of at least one of the races not exceeding about 0.93, the contact angle for each bearing ranging between about 15° and 30°.

12. In a machine tool, the combination comprising: a housing; a spindle located within the housing; and a plurality of angular contact ball bearings located between the spindle and the housing for enabling the spindle to rotate at high angular velocities within the housing about an axis of rotation, one of the bearings being oriented in opposition to the another of the bearings such that the bearings transfer radial loads and thrust loads in both axial directions between the spindle and the housing, each bearing including an inner race located around the spindle and having a raceway that is arcuate in cross section and is presented away form the axis, an outer race located in the housing and having a raceway that is arcuate in cross section and presented toward the raceway of the inner race, and balls arranged in a circular row between the inner and outer races and contacting the raceways of the races, the osculation ratio between the balls and rolling elements of at least one of the races not exceeding about 0.93, the bearings being in a condition of preload.

13. In a machine tool, the combination comprising: a housing; a spindle located within the housing; and an angular contact ball bearing located between the spindle and the housing for enabling the spindle to rotate about an axis of rotation, the bearing including an inner race fitted around the spindle with an interference fit and having a raceway that is arcuate in cross section and is presented away from the axis, an outer race located in the housing and having a raceway that is arcuate in cross section and is presented toward the raceway of the inner race, and balls arranged a circular row between the inner and outer races and contacting the raceways of the races, the inner race of the bearing being from a steel that is case-carburized or carbonitrided to form a hard case that at least initially exists in a state of compression.

14. The combination according to claim 13 wherein the interference between the inner race and the spindle when the spindle is at rest is at least about 0.0010 in.

15. The combination according to claim 13 wherein the inner race has the capacity of rotating at least $10^6$ DN without fracturing under the centrifugal forces generated.

16. In a machine tool, the combination comprising: a housing; a spindle located within the housing; and a plurality of angular contact ball bearings located between the spindle and the housing for enabling the spindle to rotate at high angular velocity within the housing about an axis of rotation, one of the bearings being oriented in opposition to another of the bearings so that the bearings transfer radial loads and thrust loads in both axial directions between the spindle and the housing, each bearing including an inner race located around the spindle and having a raceway that is arcuate in cross section and is presented away from the axis, an outer race located in the housing and having a raceway that is arcuate in cross section and is presented toward the raceway of the inner race, and balls arranged in a circular row between the inner and outer races and contacting the raceways of the races, the races of the bearings being formed from a stainless steel containing by weight no more than about 0.50% carbon and no less than about 10.0% chromium, the races having hardened cases formed by carburizing or carbonitriding.

17. The combination according to claim 16 wherein the contact angle for each bearing ranges between 15° and 30°.

18. The combination according to claim 16 wherein the bearings are in a condition of preload.

19. The combination according to claim 16 wherein the stainless steel of the races is one selected from a group consisting of CSS-42L, PYROWEAR 675 and AISI 420 steels.

20. The combination according to claim 16 wherein the raceways curve transversely with respect to the row of balls, and the transverse curvatures of the raceways for a bearing exceed the curvature of the balls for the bearing.

21. The combination according to claim 16 wherein the osculation ratio between the balls and the raceways of the inner races does not exceed 0.89.

* * * * *